United States Patent Office 3,100,935
Patented Aug. 20, 1963

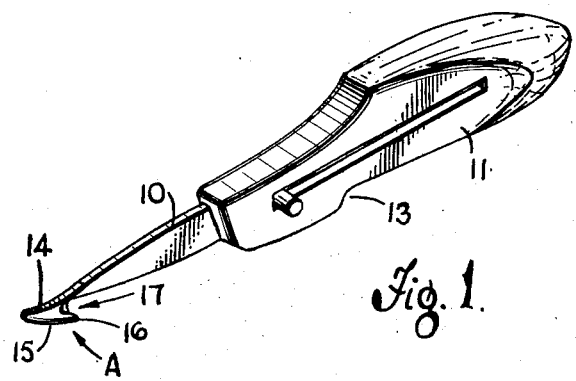
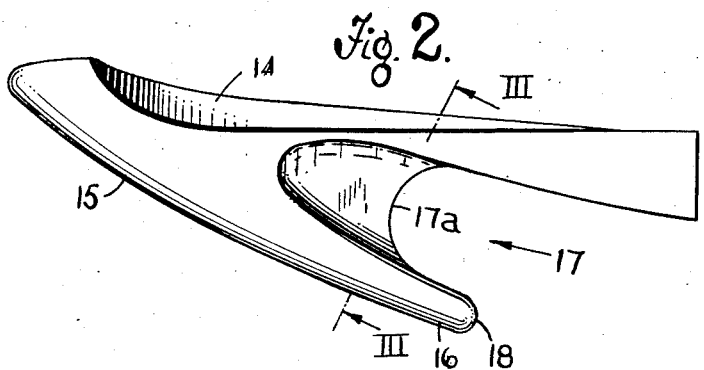

3,100,935
TOOL FOR THE RIPPING OF SEAMS AND LIKE PURPOSES
Percy Seymour Hargrave Leafe, Ealing, England, assignor to Needle Industries Limited, Studley, England, a company of Great Britain
Filed June 27, 1962, Ser. No. 205,731
1 Claim. (Cl. 30—294)

This invention relates to a tool for the ripping of seams in garments and like purposes. An object of the invention is to provide a tool by which ripping of stitches and seams can be effected easily and quickly, and in which there is little or no possibility of any part of the tool catching the material during ripping.

Tools as above set forth are manipulated by hand, and include a prong for cutting stitches and a blade which is moved to rip a seam. The blade can also be used to remove a button or other sewn-on article or like purposes.

A preferred embodiment is shown, by way of example in the accompanying drawings, in which:

FIGURE 1 is a perspective view of the tool;
FIGURE 2 is a side view to a larger scale of one end of the shank; and
FIGURE 3 is a sectional view on the line III—III of FIGURE 2.

As shown in the drawings, the tool consists of a flat shank 10 carried by a handle 11, the shank being arranged to slide in the handle so as to be retractable. The lower edge of the handle is recessed as shown at 13 to facilitate holding.

It will be understood that the shank need not be fitted to retract into a handle. It can for example be fixed to extend from a handle and a suitable slide on cap or cover provided. It can also be arranged to close into the handle penknife fashion. In this latter case the shank will be arranged to pivot to the closed position in a direction upwardly in respect of FIGURE 1, the top edge of the handle being slotted to receive the shank. To prevent closure of the shank into the handle when in use, a recess such as that shown at 13 could be formed in the upper edge of the handle, so as to allow the user to retain the shank against closure by exerting finger pressure on the exposed part of the shank in the recess.

The forward end of the shank, designated generally A, FIGURE 1 is a substantially triangular or V-shape with one leg of the V connected to the remainder of the shank, the converging end being referred to as the leading end portion, and this leading end portion terminating in a point.

One laterally presented edge of the shank is sharpened to form a concave cutter blade 14. This blade 14 is inset from the remaining edge face of the shank.

The opposite edge 15 of the forward end A of the shank is of blunt form, and is slightly concave longitudinally, and diverges with respect to the opposite edge of the shank, the shape of the blunt edge 15 being clear from FIGURE 3. The other leg of the part A forms a spur 16 which extends rearwardly from the point and obliquely towards the handle, and defines in combination with the shank a crook-shaped inner boundary or bight 17 around which boundary there is a ripping blade with a concave edge 17a which is presented rearwardly. The end of the spur is rounded off as shown by reference 18.

The shank therefore has two prongs, one, the tip extending forwardly, the other, the spur 16, which extends rearwardly, and between which and the shank 10 a concave ripper blade 17a is formed. The cutter blade 14 forms a penetrating or picking blade, and it will be understood that after a seam has been penetrated by the cutter blade 14, the spur 16 can be inserted and drawn along to rip the seam.

The two cutting edges are so arranged such that when one is in use the other is not capable of cutting any material which is in contact with it. This arises out of the positions of the blades on opposite sides of the shank.

The tool obviously can be used for other cutting operations.

What I then claim is:

A ripping tool for ripping seams in garments comprising:
(a) a handle of elongated form,
(b) a shank carried by said handle and extending longitudinally and forwardly from one end of said handle and terminating in a point at its forward end.
(c) a spur on said shank extending rearwardly from said point and obliquely towards said handle, and defining in combination with said shank a rearwardly presented crook-shaped boundry at its inner side,
(d) a concave sharp cutting edge formed on said shank in the vicinity of said point and extending along that side of said shank remote from said spur,
(e) a sharp ripping edge formed partly on said shank and partly on said spur along said crook-shaped boundary,
(f) said spur at its outer side having a blunt edge face terminating in a blunt point at the rearward end of said spur.

References Cited in the file of this patent
UNITED STATES PATENTS

| 912,146 | Moffett | Feb. 9, 1909 |
|---|---|---|
| 1,398,850 | Franco | Nov. 29, 1921 |
| 1,449,408 | Hull | Mar. 27, 1923 |
| 2,764,814 | Jecker | Oct. 2, 1956 |